United States Patent Office 3,286,979
Patented Nov. 22, 1966

3,286,979
VALVE STRUCTURE
Robert O. Brown, Springfield, Robert W. Gaul, Chester, Gordon B. Leyland, Media, and Joseph D. Conrad, Jr., Glen Mills, Pa., assignors to Westinghouse Electric Corporation, Pittsburgh, Pa., a corporation of Pennsylvania
Filed Sept. 16, 1963, Ser. No. 309,078
9 Claims. (Cl. 251—118)

This invention relates to valves for controlling flow of pressurized fluid and has for an object to provide an improved valve of this type.

It is a further object of this invention to provide a valve having improved flow characteristics, so that greater fluid flow rates can be accommodated by the valve with no increase in physical size and pressure losses or, conversely the physical size of the valve may be reduced and still accommodate the same fluid flow rates without increase in pressure losses.

Although not limited thereto, the invention is highly advantageous when employed in valves for controlling motive steam flow in large turbines, for example interceptor valves, stop valves and governing valves, since the volumetric flows encountered in steam turbines are quite large and the valves must be large to accommodate the large volumetric flows with minimum pressure losses.

Interceptor valves, in particular, have become so large, when disposed in conduits directing partially expanded steam from high pressure turbines to lower pressure turbines, that the turbine casing sizes are often predicated primarily by the size of the interceptor valves, and not steam flow conditions in the turbines.

In view of the above, it is a still further object to provide a valve of highly efficient flow characteristics that requires less material and hence may be manufactured at lower cost, and that occupies less installation space, than valves heretofore employed to control flow of pressurized fluid.

Briefly, in accordance with the invention, there is provided a valve having a body structure defining a valve chamber and having a fluid inlet and a fluid outlet communicating with the chamber. An axially movable valve member extends into the valve chamber and is arranged to block and unblock the fluid outlet. A flow guiding device, such as a tubular screen, is fixed in the chamber in spaced, encompassing concentric relation with the valve member and fluid outlet. The valve chamber is formed in such a manner that jointly with the screen, an annular fluid flow passageway is formed having a first portion of large cross-sectional area and a second portion of small cross-sectional area disposed in a diametric plane extending through the central axis of the screen and diminishing continuously and smoothly in both directions from the first portion to the second portion. At the second portion, blocking means, such as a baffle, may be emplyed to prevent flow across the second portion. Hence the flow passageway assumes a shape that may be termed "crescent-like."

The fluid inlet is disposed adjacent the first portion. Hence with the valve member in the unblocking position, the incoming fluid is admitted to the passageway at the first (or large) portion then flows in both directions through the passageway and radially inwardly through the entire periphery of the screen to the outlet. Accordingly, although the passageway diminishes in cross-sectional area in the direction of fluid flow, radially inward fluid flow through all portions of the screen is attained at a uniform rate and with uniform pressure drop.

The screen is effective to guide the flow to the fluid outlet from the fluid passageway in a large number of radially inwardly directed jets, thereby enhancing the flow characteristics of the valve.

The foregoing and other objects are effected by the invention as will be apparent from the following description and claims taken in connection with the accompanying drawings, forming a part of this application, in which:

Figure 1:
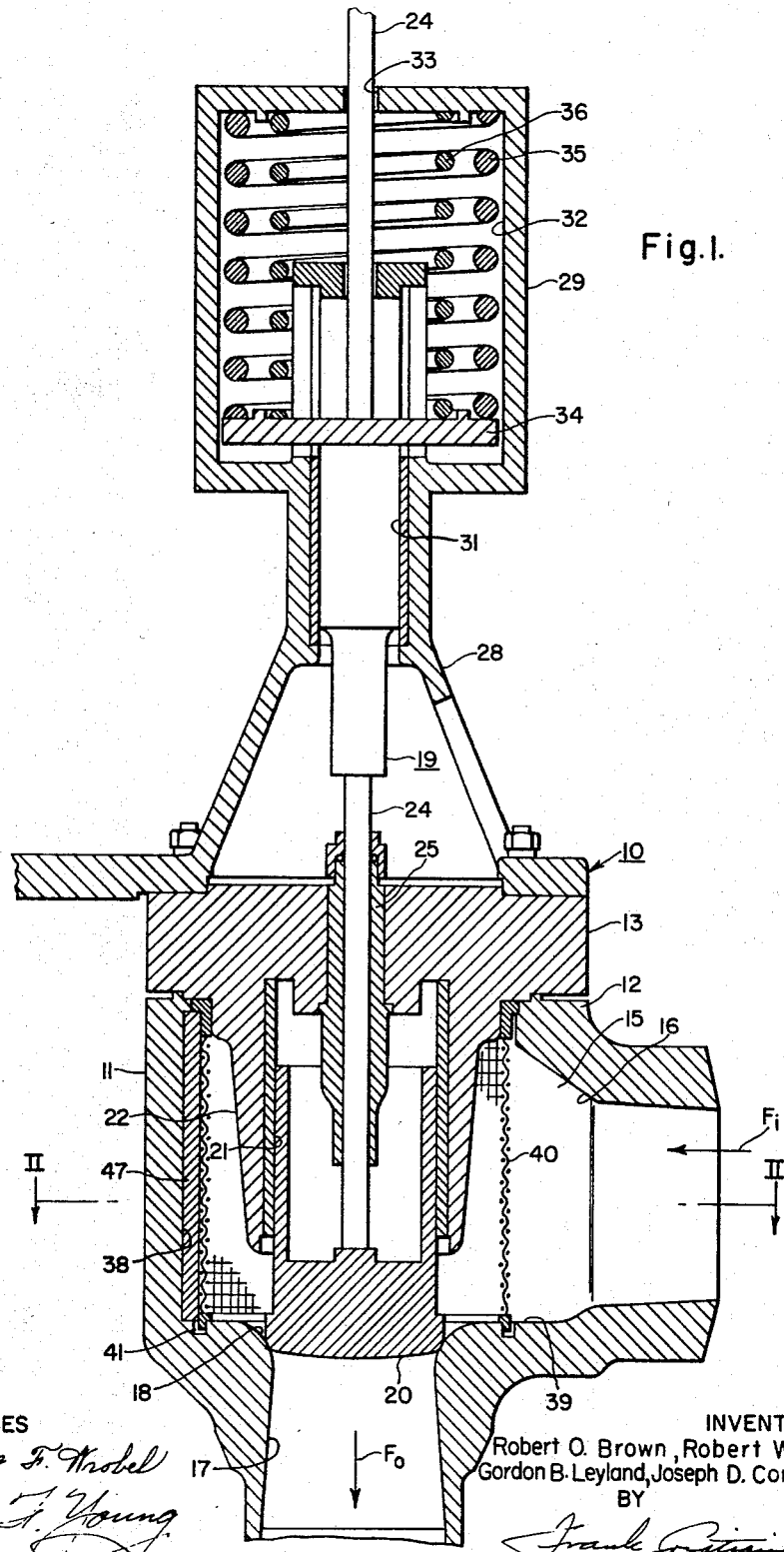
FIG. 1 is a longitudinal central sectional view of a valve structure embodying the invention.

Referring to the drawings in detail, FIG. 1 shows a valve structure, generally designated 10, formed in accordance with the invention. The valve, as illustrated, is of the type known as an "interceptor" valve. Such valves are generally widely employed in the steam turbine art for controlling steam flow from one turbine unit to another turbine unit, for example a high pressure turbine unit to a lower or intermediate pressure unit. The function of these valves is to intercept the flow of steam from the high pressure unit to the lower pressure unit rapidly in the event of sudden loss of load, malfunction of the units or any other of a wide variety of reasons, so that the mass of steam upstream of the lower pressure unit is not permitted to flow into the lower pressure unit. Otherwise rotation of the system would continue for some time after the signal to shut down the units is attained.

Accordingly, an interceptor valve must be sufficiently large to handle large volumetric flows of motive steam at all times with a minimum of pressure losses during flow through the valve structure. Because of the above, these valves are becoming larger and larger with the increase in size of the steam turbine units employed at this time, especially in conjunction with central power station equipment.

However, the invention is not limited to an interceptor valve but is susceptible of wider use where it is desirable to provide a valve having the optimum efficiency and smallest physical size consistent with such optimum efficiency. Several other examples of valves wherein the above is important are stop valves, employed in steam systems, and governing valves, also employed in steam systems for controlling the flow of steam into the high pressure unit in response to variation in load thereon, as well known in the art.

The value structure 10 is provided with a body structure having a tubular or cup-shaped body member 11 of generally cylindrical configuration having an annular open end or seal portion 12 cooperatively associated with an upper closure member 13 to form a valve chamber 15. The valve body 11 is provided with a tubular fluid inlet port 16 and a tubular outlet port 17 communicating with the valve chamber. As illustrated, the inlet port 16 and the outlet port 17 are disposed substantially at right angles to each other.

The outlet port 17 is preferably divergent to diffuse fluid flow and is provided with a smoothly rounded valve seat 18 of annular shape. A movable valve member 19 extends through the closure member 13 into the valve chamber 15 in axial alignment with the valve seat 18 and is arranged in a manner to block and unblock the outlet port 17.

The movable valve member 19 includes a cylindrical plug member 20 slidably received in a bore 21 formed in a depending boss 22, which boss may be formed as an integral part of the upper closure member 13. The valve plug 20 is attached to an actuating stem or rod 24 slidably received in a sealing member 25 disposed in the upper closure member 13, so that during use leakage is minimized between the valve stem 24 and the closure member, as well known in the art.

The valve member 19 may be positioned and operated in any suitable manner. However, as illustrated, the valve 10 is disposed on a vertical axis and is of the type biased to the closed position, but held in the open position in normal operation by a force exerted against the bias. That is, the plug 20 of the movable valve member 19 is disposed in blocking relation with the valve seat 18 and is moved in upwardly axial direction to unblock the latter. To maintain the valve member in blocking relation with the valve seat 18, there is provided a bell-shaped support structure or spider 28 having its lower end rigidly attached to the closure member 13 in any suitable manner and supporting a cylindrical shell structure 29. The shell 29 has a lower bore 31, through which the actuating stem 24 extends into the space 32 formed by the shell 29, and an aperture 33 at its upper end through which the stem 24 extends.

The stem 24 is provided with a plate or disc member 34 rigidly attached thereto and biased in downward direction by a pair of concentric helical springs 35 and 36 disposed in compression within the shell 29. Accordingly, as thus far described, the valve structure 10 is effective to maintain the movable valve member 19 in blocking relation with the valve seat 18 and the force that maintains the valve member in the blocking position is provided by the springs 35 and 36.

The valve member 19 is movable to an open or unblocking position by application of an upwardly directed force at the upper end of the stem 24, when desired. This force may be applied to the valve structure 10 manually or by any suitable actuating mechanism, such as a servo motor or fluid actuated cylinder (not shown) actuated in response to a signal. Accordingly, when the valve member 19 is moved to an unblocking position, pressurized fluid such as steam may be directed through the inlet 16 to the valve chamber 15 and thence through to the outlet 17; and when the valve member is moved to the blocking position flow of fluid through the valve is rapidly interrupted.

In accordance with the invention, the valve body 11 is formed with internal wall surfaces including a tubular wall surface 38, preferably of cylindrical shape, and a transverse lower wall surface 39 of preferably planar shape, which surfaces in conjunction with the upper closure member 13 define the valve chamber 15. The wall surface 38 is disposed with its central axis disposed as indicated at X in FIG. 2, while the central axis of the movable valve member 19 and the associated valve seat 18 is disposed as indicated at Y in FIG. 2. Stated another way, the two axes X and Y are displaced with relation to each other in a central diametric plane P which extends through the center of the fluid inlet 16.

Within the valve chamber 15 there is further provided a tubular foraminous flow guide member 40, which, as illustrated, is of substantially cylindrical shape and disposed in concentric and encompassing relation with the movable valve plug 20 and the valve seat 18. The flow guide member 40 may be formed of perforated sheet metal or wire mesh and is employed to strain solid foreign matter from the fluid flow through the valve as well as to straighten or stabilize the fluid flow through the valve on its way to the fluid outlet 17. That is, it is effective to function as a flow guide member and as a strainer. However, for simplicity, this member will hereafter be referred to as a screen member.

The screen member 40, as best shown in FIG. 1, extends in axial direction substantially the entire height of the valve chamber 15 and is secured in the body in any suitable manner. As illustrated, the screen is received in a circular groove 41 disposed in the body member 11 and is maintained in engagement with the groove 41 by the upper closure member 13.

Figure 2:
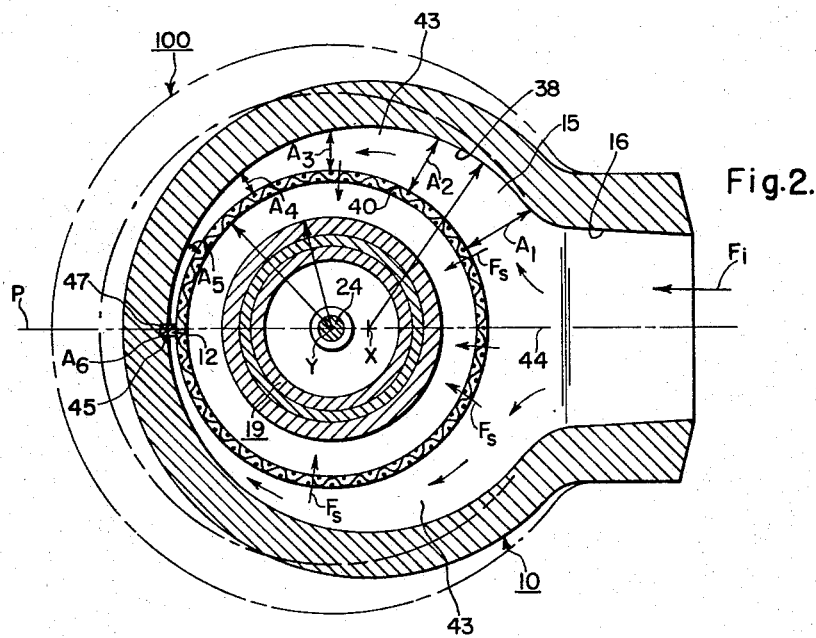
FIG. 2 is a transverse sectional view taken on line II—II of FIG. 1.

The screen member 40 and the internal wall surface 38 of the valve body are so proportioned and arranged with respect to each other that a flow passageway 43 in the valve chamber 15 is at least partially jointly defined thereby. The flow passageway 43, as best shown in FIG. 2, is of generally annular shape but of smoothly and gradually diminishing cross-sectional area in the direction of fluid flow therethrough on its way to the fluid outlet 17. More particularly, the fluid flow passageway 43 is of largest cross-sectional area at 44 and of smallest cross-sectional area at 45, which areas are disposed in the central plane P, and gradually diminishes in both directions from the area at 44 towards the area at 45. Since the fluid is admitted to the valve through the inlet 16, the full flow of the fluid is directed in the direction of the arrow $F_i$ towards the screen member 40 and then divides in the passageway 43 and is directed radially through the openings in the screen member, as indicated by the arrows $F_s$ in substantially uniform radial flow patterns, and thence through the valve seat 18, as indicated by the arrow $F_o$. Flow through the screen member is obtained throughout its entire circumferential periphery. Accordingly, the passageway 43 diminishes in accordance with the diminishing volumetric flow therethrough and permits the fluid to flow through the screen member 40 with substantially uniform pressure drop or at a uniform flow rate. That is, the cross-sectional area of the fluid flow passageway 43 diminishes in the direction of fluid flow in a uniformly progressive manner without adversely affecting the flow characteristics of the passageway 43.

Since the flow through the fluid flow passageway 43 is in opposite directions at the smallest cross-sectional area 45, there is the possibility that the two fluid flows will meet with a preponderance of some fluid flow in one or the other direction. Accordingly, there is preferably provided a baffle or blocking member 47 at the smallest cross-sectional area 45 and extending from the internal wall surface 39 substantially to the external surface of the screen member 40 and extending substantially the entire height of the valve chamber 15. The baffle 47 is effective to block or terminate the fluid flow passageway 43 in this region and results in a configuration of the fluid flow passageway 43 that may be termed "crescent-shaped."

Figure 3:
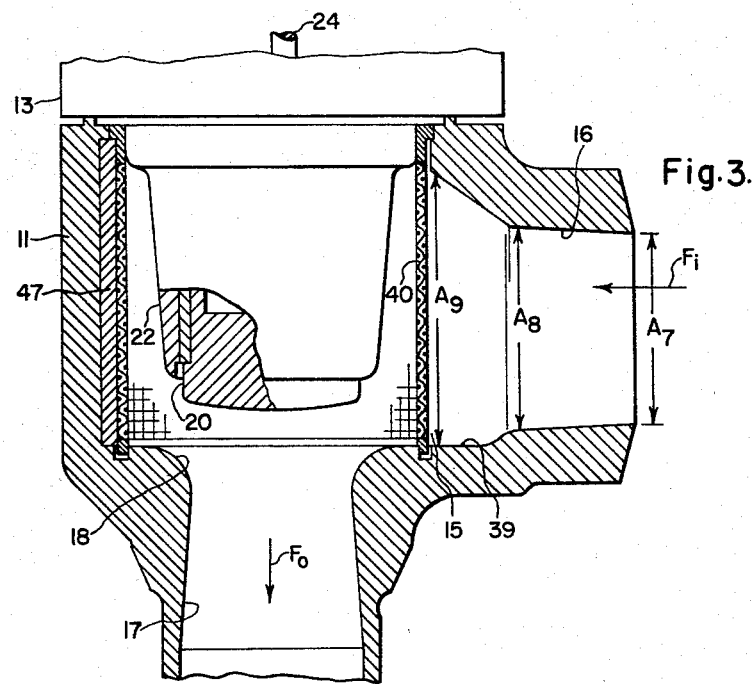
FIG. 3 is a fragmentary axial sectional view similar to that shown in FIG. 1 but with the valve in an open position.

The fluid flow passageway 43, as viewed in FIG. 2, extends counterclockwise through an angle of 180° above the central plane P and clockwise through a similar angle of substantially 180° below the central plane P. Considering now the upper half only of the flow passageway 43 (since the lower half is identical), the gradual reduction in cross-sectional area of the flow passageway has been indicated at angularly spaced increments of 30° taken about the axis Y and these increments are indicated by the dimensional arrows $A_1$, $A_2$, $A_3$, $A_4$, $A_5$, and $A_6$. In a similar manner, in FIG. 3 the cross-sectional area of the fluid inlet 16 has been shown by the dimensional arrows $A_7$, $A_8$, and $A_9$, since the fluid inlet is desirably flared outwardly or increased in cross-sectional area in downstream direction, until at $A_9$, it is substantially coextensive with the height of the chamber 15.

For flow characteristics with minimum flow losses during flow through a valve formed in accordance with the invention, the individual ratios between areas $A_1$ to $A_6$, inclusive, and $A_7$ should be on the order of the values indicated in the following table, since these are theoretical values obtained by calculation:

*Theoretical ratio*

$A_1/A_7 = 41\frac{2}{3}\%$
$A_2/A_7 = 33\frac{1}{3}\%$
$A_3/A_7 = 25\%$
$A_4/A_7 = 16\frac{2}{3}\%$
$A_5/A_7 = 8\frac{1}{3}\%$
$A_6/A_7 = 0$ 50% of the fluid admitted to the valve is directed through half of the flow passageway 43. From the above, it will be noted that the area at $A_1$ is about 41⅔% of the inlet area $A_7$. Hence in the flow path portion from 44 to $A_1$, about 8⅓% of the total flow is directed through the screen member 40 or about .2777% of the total flow per angular degree of screen member surface. The remaining areas $A_2$ to $A_6$ are similarly proportioned. Since there are 360° of screen member surface, and since the flow through the screen is about .2777% per degree, it will be readily seen that with the above area ratios the entire periphery of this screen will pass 100% of the fluid flow admitted thereto by the fluid inlet 16 with minimum flow loss.

However, to provide an ample safety factor to the valve (for example about 2:1) in order that it may accommodate larger flows without excessive flow losses the following ratios have been found to be desirable in one particular application:

*Design ratio*

$A_1/A_7 = 60\%$
$A_2/A_7 = 44\%$
$A_3/A_7 = 33\%$
$A_4/A_7 = 21\%$
$A_5/A_7 = 14\%$
$A_6/A_7 = 0$

Referring to FIG. 2, it will be noted that on the cross-sectional view of the valve structure 10 formed in accordance with the invention and fully described in the foregoing, there has been shown in phantom lines the cross-sectional extent of a prior art valve structure 100 heretofore employed by the assignee of this invention. It will be noted that the prior art structure was considerably larger than the improved valve structure 10. However, the prior art valve structure 100 was employed to handle volumetric steam flows of substantailly the same order as now controllable with the improved valve structure 10 without sacrifice in efficiency or increase in pressure losses, as explained above.

Generally speaking with respect to currently employed valves the reduction in size that is effected with the invention is on the order of about 21% in diametrical extent with a resulting reduction in weight of about 35%.

Since valves of the interceptor, stop and governing types for steam turbine apparatus are necessarily large capacity valves, the above reduction in size without sacrifice in capacity permits considerable reduction in the cost of materials, manufacturing labor, etc. and further enhances the value of the valve structure for installation because of its reduced bulk, thereby necessitating less space for installation and mounting of the valve structure in conjunction with steam apparatus to be controlled thereby.

Although only one embodiment of the invention has been shown it will be obvious to those skilled in the art that it is not so limited, but is susceptible of various other changes and modifications without departing from the spirit thereof.

We claim as our invention:

1. A valve comprising
   a valve body having internal wall surfaces defining a substantially circular valve chamber.
   said body having a fluid inlet and a fluid outlet communicating with said chamber,
   said outlet communicating with a central portion of said chamber,
   a movable valve member received in said valve chamber in cooperative association with said outlet and movable to a position unblocking said outlet, and
   annular fluid flow guide means disposed in said chamber in encompassing relation with said valve member and said outlet,
   said flow guide means and said wall surfaces jointly defining an annular fluid passageway having first and second arcuate fluid passageway portions of continuously and smoothly diminishing cross-sectional area in opposite directions about said flow guide means from said inlet to said outlet, whereby when said valve member is in an outlet unblocking position the fluid flows in opposite directions through each of said passageway portions and through said flow guide means for said passageway portions with uniform pressure drop.

2. The structure recited in claim 1 in which
   the flow guide means is a tubular foraminous member concentric with said fluid outlet, and
   the fluid passageway is of generally crescent shape with its widest portion adjacent the inlet, the passageway substantially encompassing said tubular member and diminishing in cross-sectional area in both directions from the widest portion of the crescent in such a manner that pressurized fluid admitted thereto by the fluid inlet flows through all portions of said foraminous member with uniform pressure drop.

3. A valve comprising
   a valve body having a substantially tubular internal wall surface and a transverse wall surface at least partly defining a valve chamber,
   said body having a fluid inlet port and a fluid outlet port communicating with said chamber,
   one of said ports being disposed in communication with said tubular wall and the other of said ports being disposed in communication with said transverse wall,
   an axially movable valve member received in said valve chamber in cooperative association with the port in said transverse wall, and
   flow guide means disposed in encompassing relation with said valve member and its associated port,
   said flow guide means and said wall surfaces jointly defining a fluid passageway having first and second passageway portions extending in opposite directions from said inlet port and said portions being of continuously and smoothly diminishing cross-section area in the direction of fluid flow therethrough.

4. The structure recited in claim 3 in which
   the port in the transverse wall surface is the outlet port and the port in the tubular wall surface is the inlet port,
   the flow guide means is a tubular foraminous member concentric with said outlet port, and
   the fluid passageway is of crescent shape and diminishes in cross-sectional area in both directions from the widest portion of the crescent in such a manner that pressurized fluid admitted thereto by the inlet port flows radially inwardly through all portions of said foraminous member with uniform pressure drop.

5. A valve comprising
   a valve body having a curved internal wall surface at least partly defining a valve chamber,
   said body having a fluid inlet and a fluid outlet communicating with said chamber,
   an axially movable valve member received in said valve chamber and arranged to block and unblock said fluid outlet,
   tubular flow guide structure disposed in encompassing relation with said valve member and said outlet and having a central axis,
   said flow guide structure and said curved wall surface jointly defining, at least partly, an annular fluid passageway having a first portion of large cross-sectional area disposed adjacent said inlet and a second portion of small cross-sectional area disposed substantially 180° from said inlet, said first and second passageway portions being diametrically disposed in a central plane extending through the central axis of said flow guide structure, and diminishing continuously in cross-sectional area at substantially the same rate in opposite directions from said first portion to said second portion, whereby fluid admitted to said passageway by said fluid inlet, when said valve member is in an unblocking position, flows through all portions of said flow guide structure to said outlet at a uniform rate.

6. The structure recited in claim 5 and further including
means extending coextensively with the flow guide structure in said central plane for blocking flow of fluid across the second passageway portion in either of said opposite directions.

7. The structure recited in claim 5 in which
the flow guide structure is a foraminous member and is further effective to strain solid foreign matter from the fluid, and further including
a baffle member extending from the wall structure to said foraminous member at the second passageway portion and effective to terminate flow of fluid in either of said opposite directions in the passageway.

8. The structure recited in claim 1 wherein
the annular guide means and the fluid outlet are disposed with their central axes concentric with each other,
the fluid inlet has a central axis,
said central axis being substantially normal to said central axes and lying in a common plane therewith, and one of the fluid passageway portions lying on one side of said plane and the other of the fluid passageway portions lying on the other side of said plane.

9. The structure recited in claim 1 wherein
the arcuate passageway portions are of largest cross-sectional area adjacent the fluid inlet and extend through an arcuate extent of substantially 180° in opposite directions to a region diametrically opposite the fluid inlet, and
further including a baffle structure disposed in said region for blocking flow from one to the other of said passageway portions.

References Cited by the Examiner

UNITED STATES PATENTS

| | | | |
|---|---|---|---|
| 1,547,962 | 7/1925 | Seewer | 251—118 X |
| 2,258,230 | 10/1941 | Warren | 137—549 X |
| 2,621,016 | 12/1952 | MacGregor | 251—118 X |

M. CARY NELSON, *Primary Examiner.*

MARTIN P. SCHWADRON, *Examiner.*

R. J. MILLER, *Assistant Examiner.*